United States Patent
Kuga et al.

(10) Patent No.: US 8,060,046 B2
(45) Date of Patent: Nov. 15, 2011

(54) RADIO RECEIVER AND RADIO RECEPTION METHOD

(75) Inventors: Takamichi Kuga, Shiga (JP); Yasuhisa Yao, Hyogo (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 12/402,791

(22) Filed: Mar. 12, 2009

(65) Prior Publication Data

US 2009/0239492 A1 Sep. 24, 2009

(30) Foreign Application Priority Data

Mar. 19, 2008 (JP) ................................. 2008-071319

(51) Int. Cl.
*H04B 1/06* (2006.01)
*H04B 7/00* (2006.01)

(52) U.S. Cl. ......... 455/260; 455/302; 455/255; 455/259

(58) Field of Classification Search ........................ None
See application file for complete search history.

(56) References Cited

U.S. PATENT DOCUMENTS

| 3,936,753 | A * | 2/1976 | Clark | ......................... 455/164.1 |
| 6,215,829 | B1 | 4/2001 | Tomiyama | |
| 7,177,617 | B2 * | 2/2007 | Kerth et al. | .................... 455/302 |
| 7,848,453 | B2 * | 12/2010 | Pan | ............................... 375/298 |
| 2006/0046678 | A1 | 3/2006 | Noda et al. | |
| 2006/0154640 | A1 * | 7/2006 | Oh et al. | ........................ 455/326 |
| 2011/0086605 | A1 * | 4/2011 | Chanca et al. | ................ 455/302 |

FOREIGN PATENT DOCUMENTS

| JP | 2005-192018 | 7/2005 |
| WO | WO 01/48909 A2 | 7/2001 |

* cited by examiner

*Primary Examiner* — Tuan T Lam
(74) *Attorney, Agent, or Firm* — McDermott Will & Emery LLP

(57) ABSTRACT

The radio receiver includes: a mixer configured to convert a received signal to an IF signal using a local oscillation signal; an IF processing section configured to limit the band of the IF signal; a detection section configured to demodulate the band-limited IF signal; a frequency control section configured to output a frequency control signal corresponding to a desired signal; and a local oscillation section configured to generate the local oscillation signal having a frequency corresponding to the desired signal according to the frequency control signal. The frequency control section outputs as the frequency control signal to change the frequency of the local oscillation signal so that the difference from the frequency corresponding to the desired signal is not more than the frequency of the IF signal, and determines one of the set values with which the corresponding image signal strength is lowest as the frequency control signal.

5 Claims, 7 Drawing Sheets

FIG. 8
| DIVISION RATIO | CTR1 | CTR2 |
|---|---|---|
| N | L | L |
| N + P | H | L |
| N − P | L | H |
FIG. 9A
PRIOR ART
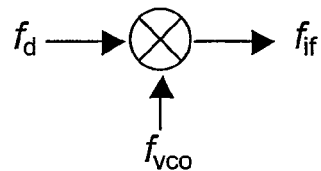
FIG. 9B
PRIOR ART
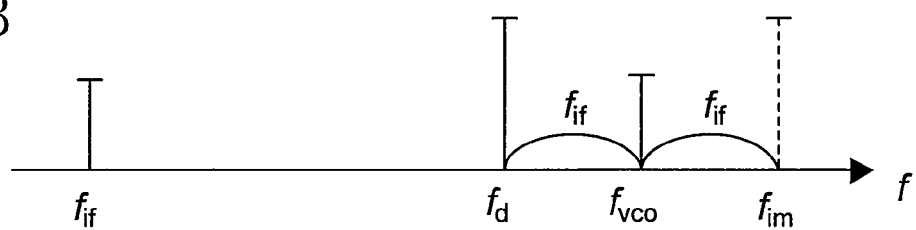
FIG. 9C
PRIOR ART
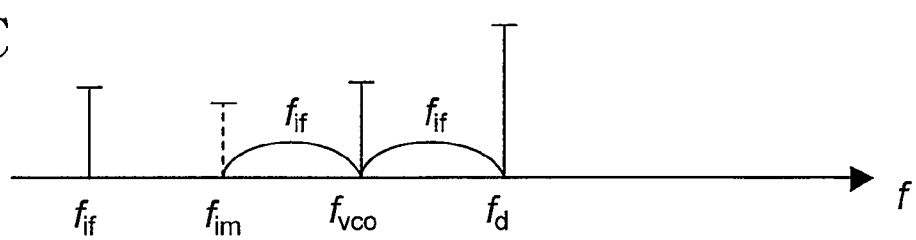

RADIO RECEIVER AND RADIO RECEPTION METHOD

CROSS-REFERENCE TO RELATED APPLICATIONS

This application claims priority under 35 U.S.C. §119 on Patent Application No. 2008-71319 filed in Japan on Mar. 19, 2008, the entire contents of which are hereby incorporated by reference.

BACKGROUND

The present disclosure relates to a radio receiver for receiving a transmitted signal.

As radio receivers, superheterodyne receivers are generally used. Superheterodyne receivers convert a received signal to an intermediate frequency (IF) signal having a given frequency at all times. Hence, this type of receivers has the following advantages among others: an interference signal is easily attenuated (interference less occurs) because the pass band of a filter can be fixed; an amplifier circuit can be easily made up; and the reception sensitivity is high. Also, under the condition where an especially strong interference signal exists, the capability of eliminating an interference signal can be improved by using a filter whose band is variable at the time of processing of an IF signal.

FIG. 9A is a diagrammatic view showing a mixer and the frequencies of its input/output signals. FIGS. 9B and 9C are views illustrating examples of the relationship between the frequency of a desired signal and the frequency of an image signal.

For reception of amplitude modulation (AM) broadcasts and frequency modulation (FM) broadcasts that use a higher-frequency signal than AM broadcasts with a common circuit, an oscillation signal from a voltage-controlled oscillator (VCO) is generally frequency-divided before being inputted into a mixer circuit for converting a received signal to an IF signal. Such frequency-divided oscillation signal is herein called a local oscillation signal. As shown in FIGS. 9B and 9C, when either of the relationships expressed by two equations:

$$f_{vco} = f_d + f_{if} \quad (1)$$

$$f_{vco} = f_d - f_{if} \quad (2)$$

is established among the frequency $f_d$ of a desired signal reception of which is desired, the frequency $f_{if}$ of an IF signal and the frequency $f_{vco}$ of a local oscillation signal (local oscillation frequency), an IF signal having the same frequency will be obtained. The case of equation (1) (FIG. 9B) is called upper heterodyne and the case of equation (2) (FIG. 9C) is called lower heterodyne.

In relation to the above, a signal (called an image signal) having a frequency $f_{im}$ satisfying $$f_{im} = f_{vco} + f_{if} \quad (3)$$

$$f_{im} = f_{vco} - f_{if} \quad (4)$$

for equation (1) and equation (2), respectively, also obtains an IF signal having the same frequency as the IF signal for the desired signal.

Existence of such an image signal causes interference (called image interference) during reception of the desired signal, worsening the reception performance of the receiver for the desired signal. It is therefore required to remove the effect of the image signal in some way or another. To secure the reception performance in an area badly affected by the interference of the image signal, the receiver should desirably have an image rejection ratio of 80 to 90 dB.

For rejection of an image signal, a radio receiver using a mixer having an image signal rejection function is well known. However, the image rejection ratio of such a radio receiver is of the order of 40 to 50 dB. Also known is a method in which a band-pass filter that allows a desired signal to pass but attenuates an image signal is inserted upstream of a mixer. Such a band-pass filter however does not serve as a useful means for a radio receiver that gives an IF signal having a frequency of several hundreds of kHz because it fails to sufficiently attenuate an image signal.

Under the above circumstances, receivers using a signal having a frequency that is less likely to cause image interference have come to be considered. An example of such receivers is disclosed in WO2001/048909. This receiver measures the image signal strength for the cases of FIGS. 9B and 9C, and adopts a local oscillation signal with which the image signal strength is lower to thereby be less affected by an image signal.

However, when the image signal strength is high in both the cases of FIGS. 9B and 9C, the receiver described above fails to satisfy a desired image rejection ratio and thus fails to receive a desired signal without interference.

The frequency difference between the image signals in the cases of FIGS. 9B and 9C is equivalent to $4 \times f_{if}$. If 500 kHz is selected as the frequency of the IF signal, the frequency difference between the image signals is 2 MHz. In this case, therefore, the strength comparison will be made between signals 2 MHz apart in frequency. In the band of FM broadcasts, there are a myriad of combinations of two signals 2 MHz apart in frequency, and the possibility that the two signals are both high in strength is not low.

SUMMARY

An object of the present invention is providing a radio receiver capable of suppressing the effect of an image signal.

The radio receiver of an embodiment of the present invention includes: a mixer configured to convert a received signal to an intermediate frequency (IF) signal using a local oscillation signal; an IF processing section configured to limit the band of the IF signal and output the band-limited signal; a detection section configured to demodulate the band-limited IF signal from the IF processing section; a frequency control section configured to output a frequency control signal corresponding to a desired signal; and a local oscillation section configured to generate the local oscillation signal having a frequency corresponding to the desired signal according to the frequency control signal. The frequency control section outputs a plurality of set values sequentially as the frequency control signal to change the frequency of the local oscillation signal so that the difference from the frequency corresponding to the desired signal is not more than the frequency of the IF signal, and determines a set value among the plurality of set values with which a corresponding image signal strength is lowest and outputs such a set value as the frequency control signal.

Hence, with the frequency of the local oscillation signal being changeable, the effect of an image signal can be suppressed. Since the difference between the pre-change and post-change frequencies is not more than the frequency of the IF signal, the frequency of one of the local oscillation signal and the desired signal that is higher in frequency will not become lower than that of the other signal.

The radio reception method of an embodiment of the present invention includes the steps of: converting a received signal to an IF signal using a local oscillation signal having a frequency corresponding to a desired signal; changing the frequency of the local oscillation signal so that the difference from the frequency corresponding to the desired signal is not more than the frequency of the IF signal; and converting the received signal using the local oscillation signal having a frequency, out of the frequency corresponding to the desired signal and the changed frequency, with which a corresponding image signal strength is lowest.

According to the embodiments of the present invention, the difference in frequency between the desired signal and the local oscillation signal is not fixed. Hence, the effect of an image signal can be avoided.

BRIEF DESCRIPTION OF THE DRAWINGS

FIG. 8 is a view illustrating the relationship between signals CTR1 and CTR2 and the division ratio outputted from a division ratio generation circuit.

FIG. 9A is a diagrammatic view showing a mixer and the frequencies of its input/output signals. FIGS. 9B and 9C are views illustrating examples of the relationship between the frequency of a desired signal and the frequency of an image signal.

DESCRIPTION OF THE PREFERRED EMBODIMENTS

Hereinafter, preferred embodiments of the present invention will be described with reference to the accompanying drawings.

The function blocks described herein can be typically implemented by hardware. For example, the function blocks can be formed on a semiconductor substrate as part of an integrated circuit (IC). The IC as used herein includes a large-scale integrated circuit (LSI), an application-specific integrated circuit (ASIC), a gate array, a field programmable gate array (FPGA) and the like. Alternatively, part or all of the function blocks can be implemented by software. For example, the function blocks can be implemented with a program executable on a processor. In other words, the function blocks described herein may be implemented by hardware, by software or by any given combination of hardware and software.

Embodiment 1

Figure 1:
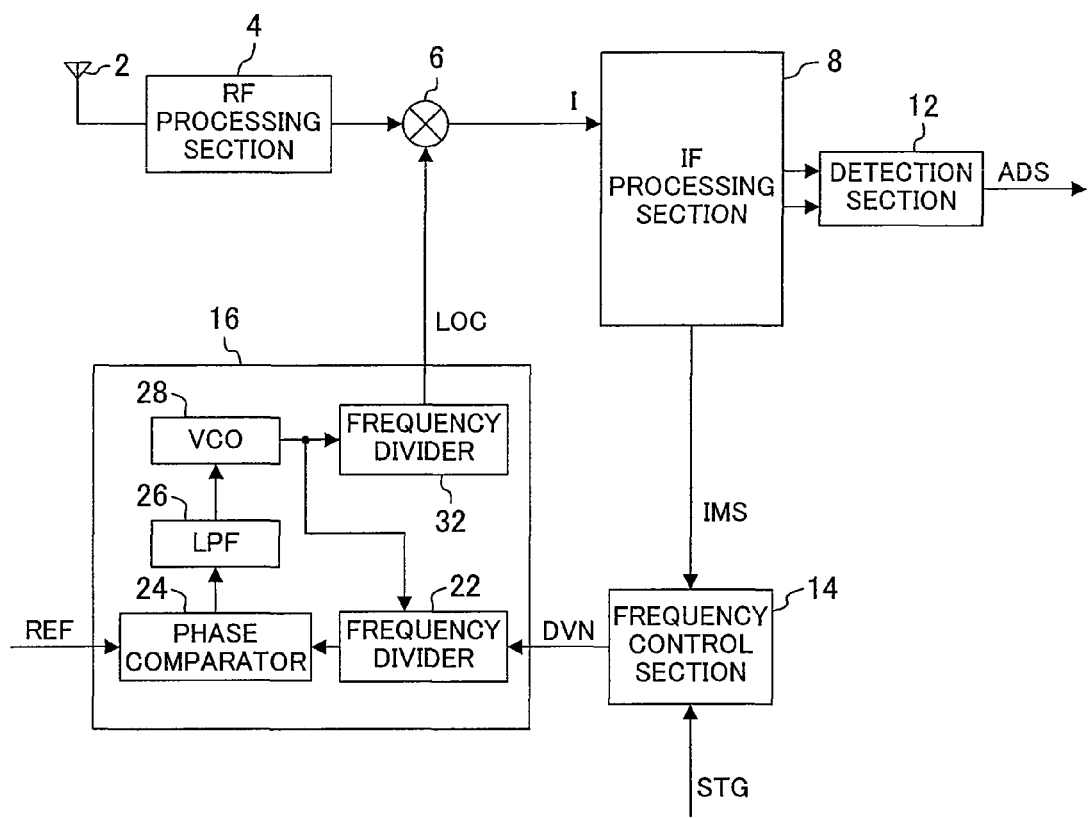
FIG. 1 is a block diagram of a radio receiver of Embodiment 1 of the present invention.

FIG. 1 is a block diagram of a radio receiver of Embodiment 1 of the present invention. The radio receiver of FIG. 1 includes a RF processing section 4, a mixer 6, an IF processing section 8, a detection section 12, a frequency control section 14 and a local oscillation section 16.

The RF processing section 4 performs processing such as amplification and band limitation for a signal received via an antenna 2 and outputs the processed signal. The mixer 6 converts the received signal outputted from the RF processing section 4 to an IF signal using a local oscillation signal (LOC) and outputs the IF signal. The IF processing section 8 performs band limitation, gain control and image signal strength measurement for the IF signal outputted from the mixer 6 and outputs the processed IF signal as well as the measured image signal strength IMS. The detection section 12 demodulates the band-limited IF signal outputted from the IF processing section 8 and outputs the resultant audio signal ADS.

The frequency control section 14 receives a reception setting signal STG specifying the frequency of a desired signal from a controller such as a CPU, determines the division ratio DVN (frequency control signal) corresponding to the frequency of a desired signal reception of which is desired and outputs the determined division ratio DVN. The desired signal is a signal transmitted from a desired station. The frequency control section 14 also changes the division ratio DVN according to the image signal strength IMS that is the value measured in the IF processing section 8. Alternatively, the RF processing section 4 may measure the strength of an image signal from the high-frequency signal at a stage before being inputted into the mixer 6, and the frequency control section 14 may use the measured value as the image signal strength IMS.

The local oscillation section 16 generates the local oscillation signal LOC from a reference signal REF according to the division ratio DVN and outputs LOC to the mixer 6. The local oscillation section 16 includes frequency dividers 22 and 32, a phase comparator 24, a low-pass filter (LPF) 26 and a voltage-controlled oscillator (VCO) 28. The frequency divider 22, the phase comparator 24, the LPF 26 and the VCO 28 constitute a phase locked loop (PLL) circuit.

The frequency divider 22 divides the frequency of the output signal of the VCO 28 at the division ratio DVN and outputs the divided signal. The phase comparator 24 compares the phase between the reference signal REF and the output of the frequency divider 22 and outputs the result to the LPF 26. The LPF 26 smoothes the output of the phase comparator 24 and outputs the smoothed signal. The VCO 28 generates a signal having a frequency corresponding to the output voltage of the LPF 26 and outputs the generated signal. The frequency divider 32 divides the frequency of the output signal of the VCO 28 at a predetermined division ratio (3, for example) and outputs the divided signal to the mixer 6 as the local oscillation signal LOC. By changing the division ratio of the frequency divider 32, broadcast reception at many places in the world and reception of both AM and FM broadcasts are permitted.

Figure 2A:
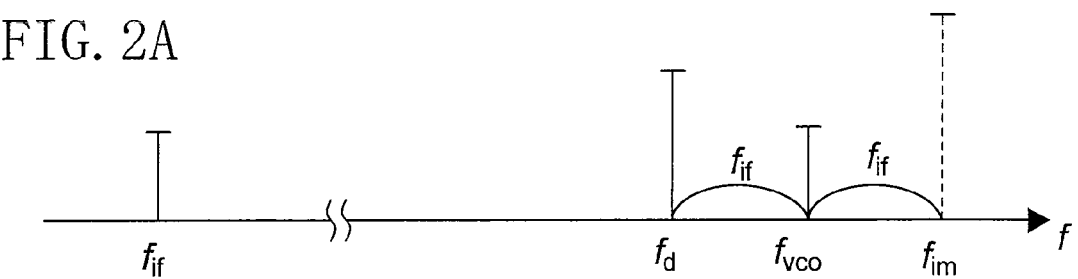
FIG. 2A is view illustrating an example of the relationship between the frequency $f_d$ of a desired signal and the image signal frequency $f_{im}$ observed when the local oscillation frequency $f_{vco}$ is higher than the frequency $f_d$ of the desired signal.
Figure 2B:
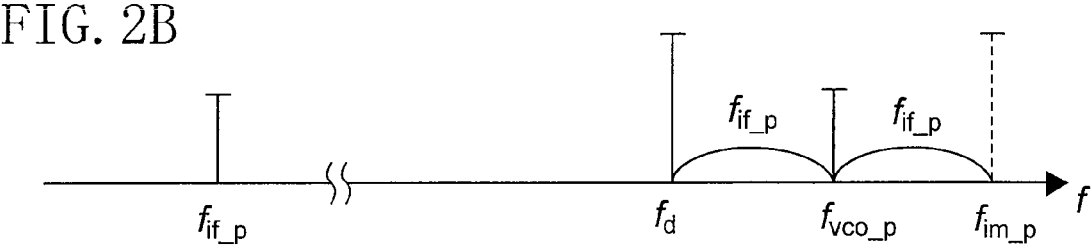
FIGS. 2B and 2C are views illustrating examples of the frequencies of the signals shown in FIG. 2A observed when the local oscillation frequency $f_{vco}$ is made higher and lower, respectively, than that in FIG. 2A.
Figure 2C:
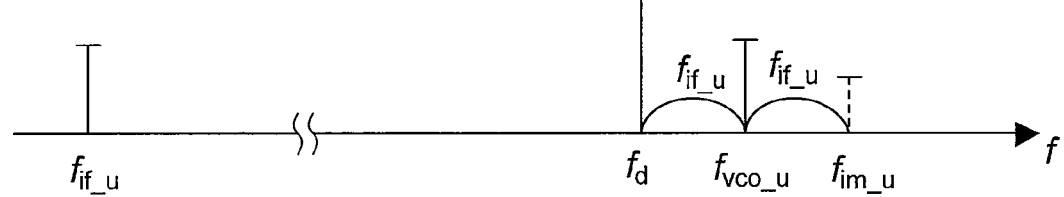

FIG. 2A is a view illustrating an example of the relationship between the frequency $f_d$ of a desired signal and the image signal frequency $f_{im}$ observed when the local oscillation frequency $f_{vco}$ (frequency of the local oscillation signal LOC, which is herein a frequency corresponding to the desired signal) is higher than the frequency $f_d$ of the desired signal. FIGS. 2B and 2C are views illustrating examples of the frequencies of the signals shown in FIG. 2A observed when the local oscillation frequency $f_{vco}$ is made higher and lower, respectively, than that in FIG. 2A.

As shown in FIG. 2A, when there exists an image signal having an image signal frequency $f_{im}$ satisfying the relationship among the frequency $f_d$ of the desired signal, the local oscillation frequency $f_{vco}$ and the image signal frequency $f_{im}$ of $$F_{vco}-f_d=f_{im}-f_{vco}=f_{if},$$

both the desired signal and the image signal will be included in the IF signal having the frequency $f_{if}$.

Once the frequency control section 14 is notified of existence of a signal of a station other than the desired station that has the image signal frequency $f_{im}$ as in FIG. 2A by means of the image signal strength IMS, it changes the division ratio DVN and outputs the changed division ratio to the local oscillation section 16. The local oscillation section 16 changes the frequency of the local oscillation signal LOC to correspond to the division ratio DVN. In this relation, the frequency control section 14 generates the division ratio DVN for changing the local oscillation frequency so that the difference between the post-change local oscillation frequency and the pre-change local oscillation frequency $f_{vco}$ is not more than the frequency $f_{if}$ of the IF signal.

For example, the frequency control section 14 changes the division ratio DVN so that the local oscillation frequency $f_{vco}$ becomes higher. When the local oscillation frequency is $f_{vco\_p}$ and the frequency of the IF signal is $f_{if\_p}$ as shown in FIG. 2B, the image signal frequency is $f_{im\_p}$. Hence, the image signal having the frequency $f_{im}$ is no more included in the IF signal. The effect of the image signal can therefore be avoided or suppressed.

Otherwise, the frequency control section 14 may change the frequency ratio DVN so that the local oscillation frequency $f_{vco}$ becomes lower. When the local oscillation frequency is $f_{vco\_u}$ and the frequency of the IF signal is $f_{if\_u}$ as shown in FIG. 2C, the image signal frequency is $f_{im\_u}$. Hence, the image signal having the frequency $f_{im}$ is no more included in the IF signal. The effect of the image signal can therefore be avoided or suppressed.

The difference between the post-change local oscillation frequency $f_{vco-p}$ or $f_{vco-u}$ and the pre-change local oscillation frequency $f_{vco}$ is not more than the frequency $f_{if}$ of the IF signal; hence the post-change local oscillation frequency $f_{vco-p}$ will not be smaller than the frequency $f_d$ of the desired signal.

Figure 3:
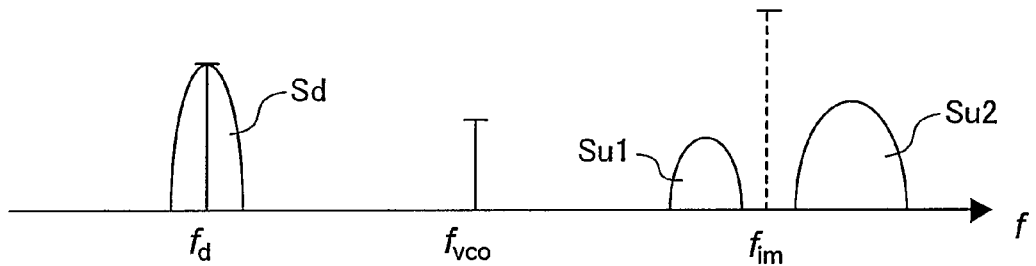
FIG. 3 is a spectrum diagram of the desired signal and signals of other stations.

FIG. 3 is a spectrum diagram showing a spectrum Sd of the desired signal and spectra Su1 and Su2 of signals of other stations. As illustrated, the spectra of actual transmitted signals have some degree of spread. In the change of the local oscillation frequency, the frequency control section 14 selects the division ratio DVN ensuring that the image signal frequency $f_{im}$ does not fall within the ranges of the spectra Su1 and Su2 of the signals of other stations.

Figure 4A:
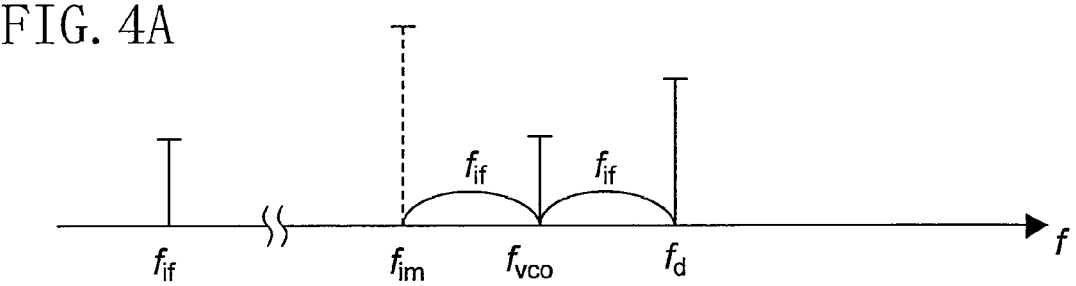
FIG. 4A is view illustrating an example of the relationship between the frequency $f_d$ of a desired signal and the image signal frequency $f_{im}$ observed when the local oscillation frequency $f_{vco}$ is lower than the frequency $f_d$ of the desired signal.
Figure 4B:
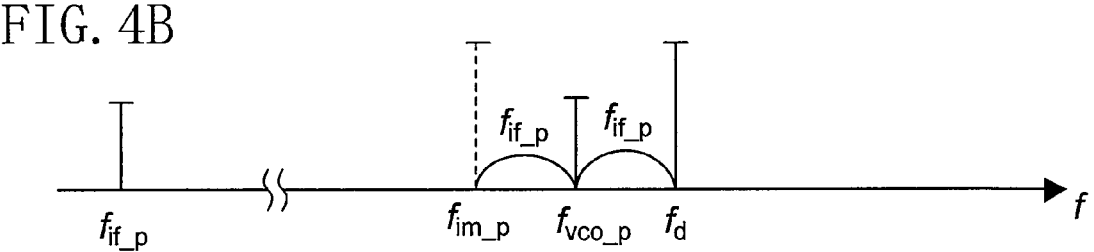
FIGS. 4B and 4C are views illustrating examples of the frequencies of the signals shown in FIG. 4A observed when the local oscillation frequency $f_{vco}$ is made higher and lower, respectively, than that in FIG. 4A.
Figure 4C:
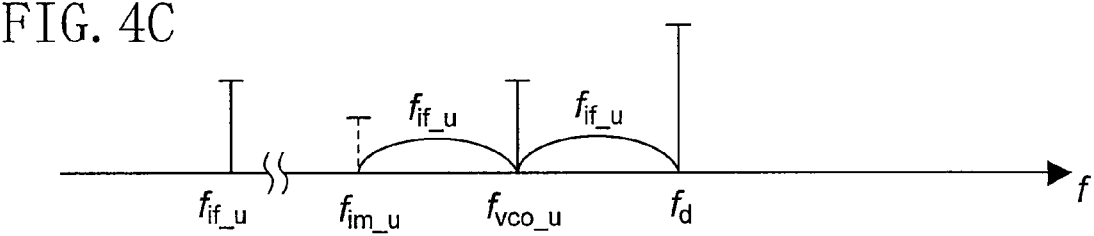

FIG. 4A is a view illustrating an example of the relationship between the frequency $f_d$ of the desired signal and the image signal frequency $f_{im}$ observed when the local oscillation frequency $f_{vco}$ is lower than the frequency $f_d$ of the desired signal. FIGS. 4B and 4C are views illustrating examples of the frequencies of the signals shown in FIG. 4A observed when the local oscillation frequency $f_{vco}$ is made higher and lower, respectively, than that in FIG. 4A.

In the case that the local oscillation frequency $f_{vco}$ is lower than the frequency $f_d$ of the desired signal, also, the frequency control section 14 operates as in the case of FIG. 2A when the local oscillation frequency $f_{vco}$ is higher than the frequency $f_d$ of the desired signal. In other words, once the frequency control section 14 recognizes from the image signal strength IMS that there exists a signal of a station other than the desired station having the image signal frequency $f_{im}$ as in FIG. 4A, it changes the division ratio DVN and outputs the changed division ratio to the local oscillation section 16. The local oscillation section 16 changes the frequency of the local oscillation signal LOC to correspond to the division ratio DVN. In this relation, the frequency control section 14 generates the division ratio DVN for changing the local oscillation frequency so that the difference between the post-change local oscillation frequency and the pre-change local oscillation frequency $f_{vco}$ is not more than the frequency $f_{if}$ of the IF signal.

For example, the frequency control section 14 changes the division ratio DVN so that the local oscillation frequency $f_{vco}$ becomes higher. When the local oscillation frequency is $f_{vco\_p}$ and the frequency of the IF signal is $f_{if\_p}$ as shown in FIG. 4B, the image signal frequency is $f_{im\_p}$. Otherwise, the frequency control section 14 may change the frequency ratio DVN so that the local oscillation frequency $f_{vco}$ becomes lower. When the local oscillation frequency is $f_{vco\_u}$ and the frequency of the IF signal is $f_{if\_u}$ as shown in FIG. 4C, the image signal frequency is $f_{im\_u}$. In both cases of FIGS. 4B and 4C, the image signal having the frequency $f_{im}$ is no more included in the IF signal. The effect of the image signal can therefore be avoided or suppressed.

The operation of the radio receiver of FIG. 1 will be described in a concrete manner. The frequency control section 14, which stores a plurality of set values, for example, first outputs a set value A0 corresponding to the desired signal as the division ratio DVN. The local oscillation section 16 generates the local oscillation signal LOC having a frequency corresponding to this set value (frequency: $f_{vco}$) and outputs the generated signal to the mixer 6. At this time, the frequency $f_{vco}=f_d\pm f_{if}$. The mixer 6 converts the received signal from the RF processing section 4 to an IF signal using the local oscillation signal LOC and outputs the converted signal. The IF processing section 8 measures the image signal strength of the IF signal received from the mixer 6 and outputs the measured image signal strength IMS to the frequency control section 14.

The frequency control section 14 then outputs another set value A1 (A1<A0) as the division ratio DVN, and the local oscillation section 16 generates the local oscillation signal LOC having a frequency corresponding to this set value and outputs the generated signal to the mixer 6. The frequency of the local oscillation signal LOC generated this time is $f_{vco\_p}$. In other words, the frequency control section 14 changes the frequency of the local oscillation signal LOC so that the difference between the changed frequency and the frequency $f_{vco}$ corresponding to the desired signal is not more than the frequency $f_{if}$ of the IF signal. The mixer 6 converts the received signal from the RF processing section 4 to the IF signal using this local oscillation signal LOC and outputs the converted signal. The IF processing section 8 measures the image signal strength of the IF signal received from the mixer 6 and outputs the measured image signal strength IMS to the frequency control section 14.

The frequency control section 14 then outputs yet another set value A2 (A2>A0) as the division ratio DVN, and the local oscillation section 16 generates the local oscillation signal LOC having a frequency corresponding to this set value and outputs the generated signal to the mixer 6. The frequency of the local oscillation signal LOC generated this time is $f_{vco\_u}$. In other words, the frequency control section 14 changes the frequency of the local oscillation signal LOC so that the difference between the changed frequency and the frequency $f_{vco}$ corresponding to the desired signal is not more than the frequency $f_{if}$ of the IF signal. The mixer 6 converts the received signal from the RF processing section 4 to the IF signal using this local oscillation signal LOC and outputs the converted signal. The IF processing section 8 measures the image signal strength of the IF signal received from the mixer 6 and outputs the measured image signal strength IMS to the frequency control section 14.

The frequency control section 14 determines a set value, among the plurality of set values outputted as the division ratio DVN, with which the corresponding image signal strength IMS is lowest, and outputs the determined set value as the final division ratio DVN. The local oscillation section 16 generates the local oscillation signal LOC having a frequency corresponding to the division DVN and outputs the signal to the mixer 6. The mixer 6 converts the received signal from the RF processing section 4 to the IF signal using this local oscillation signal LOC and outputs the converted signal. Since the local oscillation frequency is changed through generation of the division ratio DVN, change of the local oscillation frequency by software can be easily implemented by use of a CPU and the like as the frequency control section 14.

Assume that the frequency of the IF signal is set at 500 kHz, for example, and the local oscillation frequency is shifted to higher and lower values by 200 kHz each. Since the transmission frequency interval for FM broadcast stations in Japan, for example, is 200 kHz at minimum, it is rare to have the case that three high-strength signals exist consecutively every 200 kHz. Hence, it is possible to select a setting, among the three settings of the local oscillation frequency, which is not affected by an image signal.

In the above description, the frequency control section 14 first outputted the set value A0 corresponding to the local oscillation signal LOC having the frequency $f_{vco}$ and thereafter sequentially outputted other set values, as an example. The order of the output of the set values is not limited to this.

The frequency control section 14 may use three or more set values in addition to the set value A0 to generate the local oscillation signal LCO having other frequencies. In other words, four or more local oscillation frequencies may be set. With this, the possibility of being affected by an image signal can be made smaller also in the use in Europe in which many adjacent stations exist.

Figure 5:
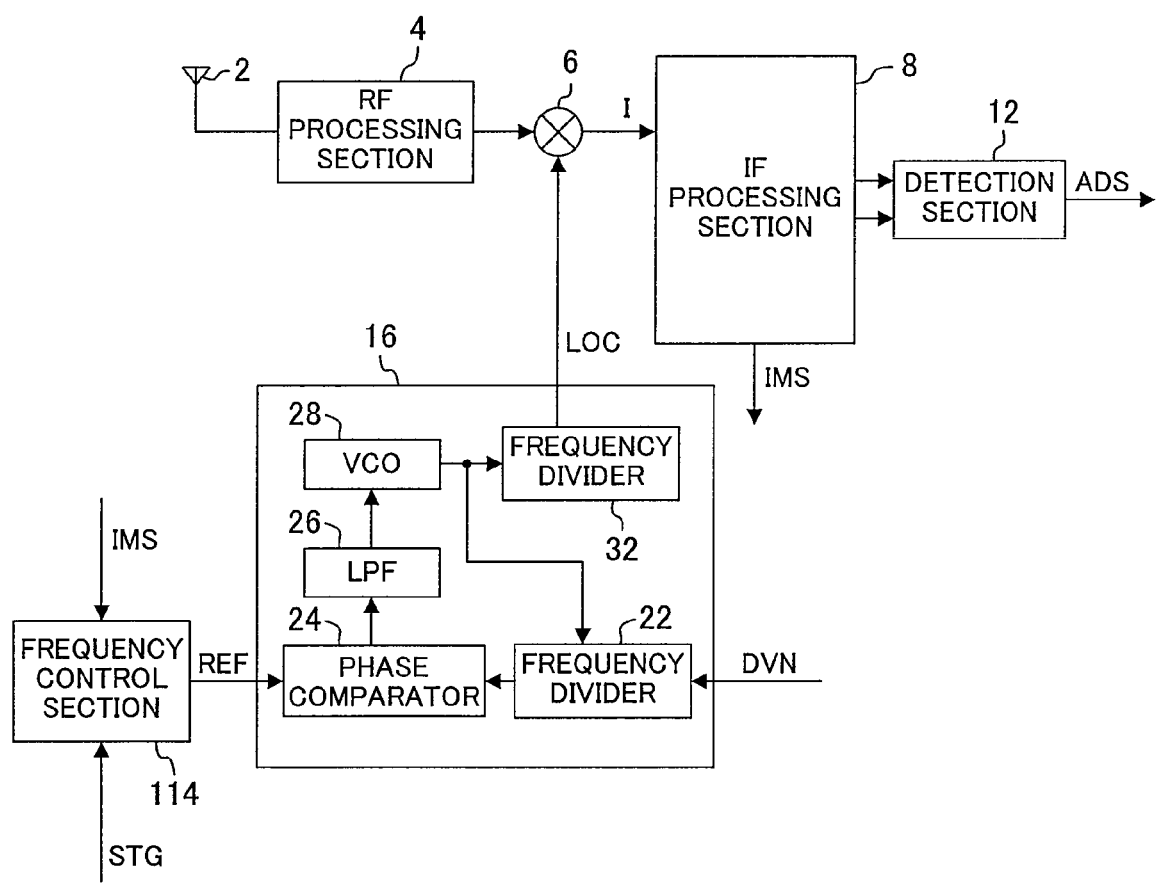
FIG. 5 is a block diagram of an alteration of the radio receiver of FIG. 1.

FIG. 5 is a block diagram of an alteration of the radio receiver of FIG. 1. The radio receiver of FIG. 5 is different from the radio receiver of FIG. 1 in including a frequency control section 114 in place of the frequency control section 14. In this alteration of FIG. 5, the division ratio DVN is a given fixed value, for example.

The frequency control section 114 receives the reception setting signal STG specifying the frequency of a desired signal from a controller such as a CPU, generates a reference signal (reference clock) REF having a frequency corresponding to the frequency of a desired signal reception of which is desired and outputs the reference signal as the frequency control signal. The frequency control section 114 also changes the frequency of the reference signal REF according to the image signal strength IMS. The local oscillation section 16 generates the local oscillation signal LOC using the reference signal REF. Specifically, the phase comparator 24 compares the phase between the reference signal REF generated in the frequency control section 114 and the output of the frequency divider 22. The image signal strength IMS used in the frequency control section 114 may be the value measured in the IF processing section 8 or may be the strength of an image signal measured in the RF processing section 4 or the like from the high-frequency signal at a stage before being inputted into the mixer 6.

Once the frequency control section 114 is notified of existence of a signal of a station other than the desired station that has the image signal frequency $f_{im}$ as in FIG. 2A by means of the image signal strength IMS, it changes the frequency of the reference signal REF and outputs the resultant signal to the local oscillation section 16. The local oscillation section 16 changes the frequency of the local oscillation signal LOC to correspond to the frequency of the reference signal REF. In this relation, the frequency control section 114 generates the reference signal REF for changing the local oscillation frequency so that the difference between the post-change local oscillation frequency and the pre-change local oscillation frequency $f_{vco}$ is not more than the frequency $f_{if}$ of the IF signal.

As described above, according to the radio receivers of FIGS. 1 and 5, the local oscillation frequency is changed slightly to permit selection of a setting least affected by an image signal, to thereby minimize the effect of the image signal. With this, a receiver having its original image rejection ratio of 40 to 50 dB can attain a level of performance equivalent to a receiver having an image rejection ratio of 80 to 90 dB, for example.

Embodiment 2

Figure 6:
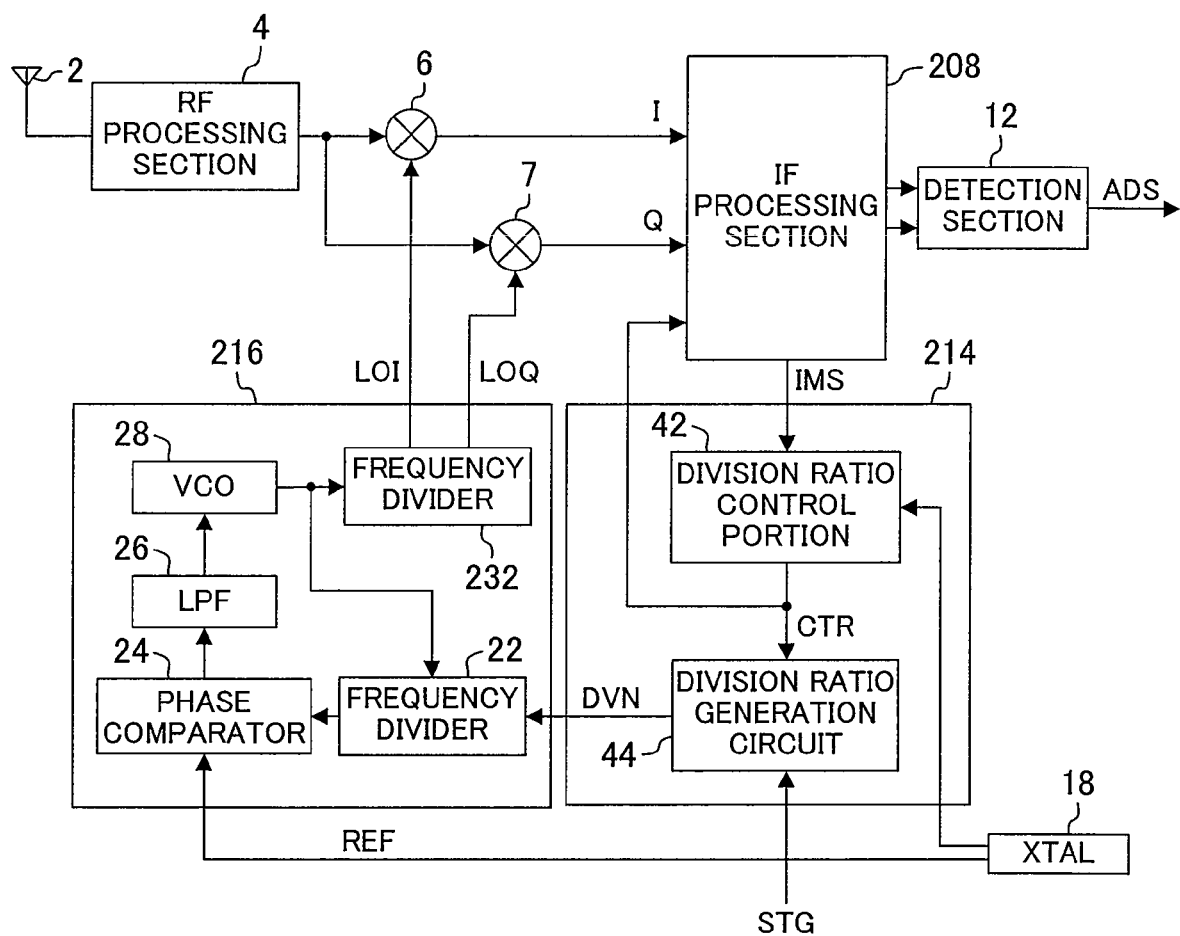
FIG. 6 is a block diagram of a radio receiver of Embodiment 2 of the present invention.

FIG. 6 is a block diagram of a radio receiver of Embodiment 2 of the present invention. The radio receiver of FIG. 6 is different from the radio receiver of FIG. 1 in including an IF processing section 208, a frequency control section 214 and a local oscillation section 216, in place of the IF processing section 8, the frequency control section 14 and the local oscillation section 16, and additionally including a mixer 7 and a crystal oscillator 18. The other components that are the same as those of the radio receiver of FIG. 1 are denoted by the same reference numerals, and description thereof is omitted in this embodiment.

The local oscillation section 216 is different from the local oscillation section 16 in FIG. 1 in having a frequency divider 232 in place of the frequency divider 32. The frequency divider 232 divides the frequency of the output signal of the VCO 28 and outputs the results to the mixers 6 and 7. The frequency divider 232 gives a phase difference of 90 degrees between the signal to be outputted to the mixer 6 and the signal to be outputted to the mixer 7 and outputs the signals as local oscillation signals LOI and LOQ, respectively. The mixers 6 and 7 convert the received signal from the RF processing section 4 to IF signals using their corresponding local oscillation signals LOI and LIQ and output the converted signals to the IF processing section 208 as an I signal and a Q signal, respectively.

The IF processing section 208 performs band limitation and gain control for the IF signals outputted from the mixers 6 and 7 and outputs the processed IF signals to the detection section 12. Also, the IF processing section 208 measures the image signal strength from the information on the phase and amplitude of the I signal and the Q signal and outputs the measured image signal strength IMS to the frequency control section 214.

The frequency control section 214 has a division ratio control portion 42 and a division ratio generation circuit 44. The crystal oscillator 18 outputs the reference signal REF to the phase comparator 24 and a clock to the division ratio control portion 42. The division ratio control portion 42 generates a division ratio control signal CTR so as to reduce the image signal strength IMS and outputs the signal to the division ratio generation circuit 44 and the IF processing section 208.

The division ratio generation circuit 44 receives the reception setting signal STG specifying the frequency of a desired signal from a controller such as a CPU, determines the division ratio DVN (frequency control signal) corresponding to the frequency of a desired signal reception of which is desired and outputs the determined division ratio DVN. The division ratio generation circuit 44 also changes the division ratio DVN according to the division ratio control signal CTR.

For example, the division ratio generation circuit 44 generates a plurality of values N, N−P and N+P (N and P are natural numbers) as the division ratio according to the reception setting signal STG and outputs only a value out of these values specified by the division ratio control signal CTR to the frequency divider 22. The division ratio generation circuit 44 may otherwise receive these values N, N−P and N+P from the CPU and the like.

Figure 7:
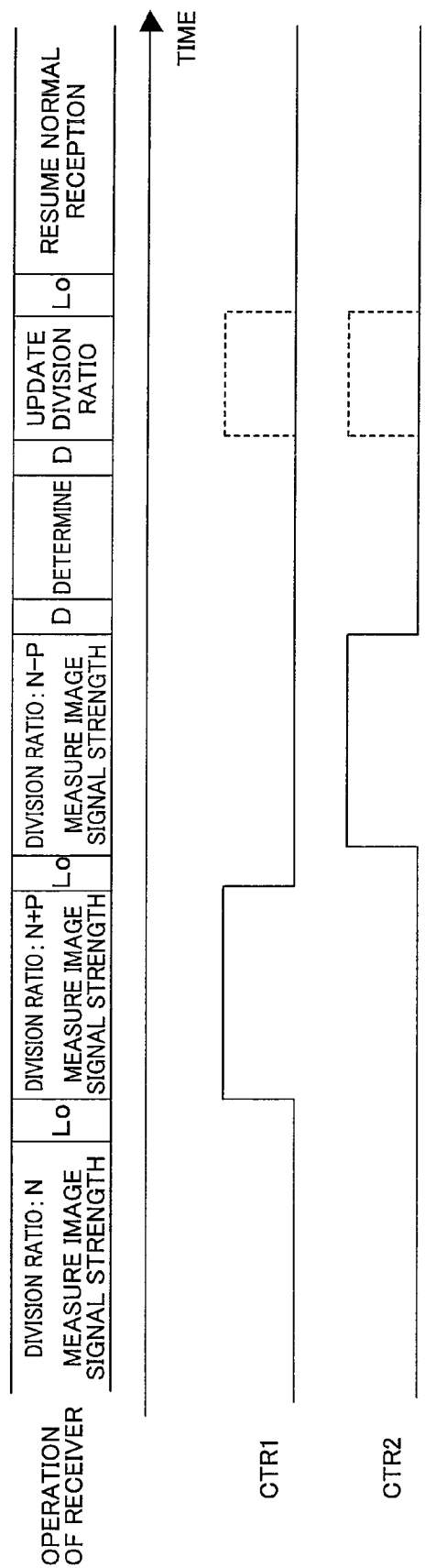
FIG. 7 is a timing chart showing an example of the operation of the radio receiver of FIG. 6.

FIG. 7 is a timing chart showing an example of the operation of the radio receiver of FIG. 6. FIG. 8 is a view showing the relationship between signals CTR1 and CTR2 and the division ratio outputted from the division ratio generation circuit 44. The division ratio control signal CTR includes the signals CTR1 and CTR2. Referring to FIGS. 7 and 8, the operation of the radio receiver of FIG. 6 will be described taking as an example the case that the frequency $f_d$ of the desired signal and the image signal frequency $f_{im}$ have a relationship as shown in FIG. 2A.

First, the division ratio generation circuit 44 outputs the value N as the division ratio DVN. At this time, the signals CTR1 and CTR2 are both "L" (low in potential). The local oscillation section 216 outputs the local oscillation signals LOI and LOQ having a frequency corresponding to the division ratio DVN. The IF processing section 208 measures the image signal strength, which is assumed as $V_{im0}$.

The division ratio control portion 42 then changes the signal CTR1 to "H" (high in potential). In response to this, the division ratio generation circuit 44 outputs the value N+P as the division ratio DVN. The local oscillation section 216 outputs the local oscillation signals LOI and LOQ having a frequency corresponding to the division ratio DVN. The IF processing section 208 changes a parameter required for IF processing, such as the center frequency and the bandwidth of the pass band of a filter, for example, according to the signals CTR1 and CTR2. The frequencies then have a relationship as shown in FIG. 2C. The IF processing section 208 also measures the image signal strength, which is assumed as $V_{im\_u}$.

By shifting the local oscillation frequency, the frequency of the IF signal also shifts. If the IF processing section has a very narrow band-pass filter as countermeasures against interruption from an adjacent station or for any other reason, the frequency shift of the IF signal may cause a problem. Such a problem can be avoided by changing the center frequency of the pass band of the filter of the IF processing section 208 in agreement with the frequency shift of the IF signal according to the signals CTR1 and CTR2; hence the reception performance can be prevented from deteriorating.

The division ratio control portion 42 then changes the signal CTR1 to "L" and the signal CTR2 to "H". In response to this, the division ratio generation circuit 44 outputs the value N−P as the division ratio DVN. The local oscillation section 216 outputs the local oscillation signals LOI and LOQ having a frequency corresponding to the division ratio DVN.

The IF processing section 208 changes a parameter required for the IF processing, such as the center frequency and the bandwidth of the filter, for example, according to the signals CTR1 and CTR2. The frequencies then have a relationship as shown in FIG. 2B. The IF processing section 208 also measures the image signal strength, which is assumed as $V_{im\_p}$.

At the change of the frequency of the local oscillation signals LOI and LOQ, a time Lo for lockup is desirably considered as shown in FIG. 7. The three measured values of the image signal strength are all stored in the division ratio control portion 42.

After the lapse of a wait time D, the division ratio control portion 42 makes a determination as to which of the three values of the image signal strength $V_{im0}$, $V_{im\_u}$ and $V_{im\_p}$ is lowest. If determining that the image signal strength $V_{im\_p}$ is lowest, the division ratio control portion 42 makes the signal CTR1 "L" and the signal CTR2 "H" after another wait time D, to update the division ratio DVN to the optimum value N−P. At and after this update, the division ratio generation circuit 44 output the value N−P as the division ratio DVN.

After the lapse of a time Lo for lockup, the receiver of FIG. 6 resumes its normal reception state. The frequencies now have a relationship as shown in FIG. 2B, and the radio receiver of FIG. 6 operates in a manner of being least affected by an image signal among the cases that the division ratio is N, N+P and N−P.

The way of setting the value P will be described. The value N and the minimum resolution $\Delta f_{min}$ of the local oscillation frequency are respectively expressed by $$N = F_{vcox}/F_{ref}$$

$$\Delta f_{min} = F_{ref}/M_{div}$$

where $F_{vcox}$ is the oscillation frequency of the VCO 28, $F_{ref}$ is the frequency of the reference signal REF and $M_{div}$ is the division ratio of the frequency divider 232.

From the above equations, assuming that the frequency $F_{ref}$ of the reference signal REF is 50 kHz and the division ratio of the frequency divider 232 is 2, the minimum resolution $\Delta f_{min}$ will be 25 kHz. In reception of an FM modulated signal, it is desired to shift the local oscillation frequency by at least 50 kHz to avoid the reception performance from deteriorating due to an image signal. Hence, P=2 is set, for example. In this way, the value P should desirably be determined through thorough consideration of the factors such as the frequency of the reference signal REF, the division ratio of the frequency divider 232 and the like.

In the above embodiments, a value corresponding to the division ratio, not the division ratio itself, may be used as the frequency control signal. In this case, the frequency divider 22 should divide the frequency of the output signal of the VCO 28 with a division ratio corresponding to the frequency control signal.

As described above, according to the embodiments of the present invention, the effect of an image signal can be suppressed. The present invention is therefore useful for radio receivers and the like.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A radio receiver comprising:
   a mixer configured to convert a received signal to an intermediate frequency (IF) signal using a local oscillation signal;
   an IF processing section configured to limit the band of the IF signal and output the band-limited signal;
   a detection section configured to demodulate the band-limited IF signal from the IF processing section;
   a frequency control section configured to output a frequency control signal corresponding to a desired signal; and
   a local oscillation section configured to generate the local oscillation signal having a frequency corresponding to the desired signal according to the frequency control signal,
   wherein the frequency control section outputs a plurality of set values sequentially as the frequency control signal to change the frequency of the local oscillation signal so that the difference from the frequency corresponding to the desired signal is not more than the frequency of the IF signal, and determines a set value among the plurality of set values with which a corresponding image signal strength is lowest and outputs such a set value as the frequency control signal.

2. The radio receiver of claim 1, wherein the local oscillation section has a phase locked loop (PLL) circuit for generating the local oscillation signal, and the division ratio of the PLL circuit is specified with the frequency control signal.

3. The radio receiver of claim 1, wherein the local oscillation section uses the frequency control signal as a reference signal for generating the local oscillation signal.

4. The radio receiver of claim 1, wherein the frequency control section outputs a signal corresponding to the frequency control signal to the IF processing section, and
   the IF processing section changes the pass band of the IF signal according to the signal corresponding to the frequency control signal.

5. A radio reception method comprising the steps of:
   converting a received signal to an IF signal using a local oscillation signal having a frequency corresponding to a desired signal;
   changing the frequency of the local oscillation signal so that the difference from the frequency corresponding to the desired signal is not more than the frequency of the IF signal; and
   converting the received signal using the local oscillation signal having a frequency, out of the frequency corresponding to the desired signal and the changed frequency, with which a corresponding image signal strength is lowest.

* * * * *